April 23, 1963   G. R. HOWLAND ETAL   3,086,361
COMBUSTION VAPORIZER

Filed Dec. 6, 1960                             2 Sheets-Sheet 1

GEORGE R. HOWLAND
DONALD A. MALOHN
INVENTORS

BY John R. Faulkner
   Keith L. Zerschling
   ATTORNEYS

April 23, 1963   G. R. HOWLAND ETAL   3,086,361
COMBUSTION VAPORIZER

Filed Dec. 6, 1960   2 Sheets-Sheet 2

GEORGE R. HOWLAND
DONALD A. MALOHN
INVENTORS

BY John R. Faulkner
Keith L. Berschling

ATTORNEYS

United States Patent Office 3,086,361
Patented Apr. 23, 1963

3,086,361
COMBUSTION VAPORIZER
George R. Howland and Donald A. Malohn, Dearborn, Mich., assignors to Ford Motor Company, Dearborn, Mich., a corporation of Delaware
Filed Dec. 6, 1960, Ser. No. 74,019
10 Claims. (Cl. 60—39.14)

This invention relates to a combustion vaporizer that may be employed in a continuous type combustion chamber and more particularly to a self-igniting combustion vaporizer in which electrical energy is passed, during starting conditions, through a portion of a fuel conduit that serves as a means for issuing fuel into the combustion chamber.

In the preferred embodiment of the invention, the combustion vaporizer includes a tube constructed of electrical conductive material having substantial resistivity. This tube projects through the housing of a continuous type combustion chamber, that may be employed in a gas turbine engine, and is formed into one or more coils. The end of the tube is closed and a plurality of orifices are positioned within one of the coils. This end of the tube is then electrically connected to the housing of the combustion chamber through any suitable means, and an electrical connector is placed in contact with the coil or coils at a position so that electrical current may be fed through the coil, or the coils, during starting operations.

In the preferred embodiment of the invention, one or more of the coils are connected in series with an electric starter motor for a gas turbine engine. When the starter motor is first energized and before it begins to rotate at any substantial speed, it draws a very heavy current that in turn flows through the coils of the combustion vaporizer thereby heating them very rapidly to a very high temperature. Fuel is supplied to the tube and to the coils, preferably through a metering orifice, and as it flows through the coils it is vaporized from the heat generated by the electrical current. After leaving the coils through the plurality of orifices, the vaporized fuel mixes with the air in the combustion chamber and is ignited when it strikes the outer surface of the coils. After combustion commences, the starter motor and the electrical current are shut off, and combustion is then self-sustaining since the flame from the fuel heats the coils of the vaporizer. Although it is preferred to employ the starter motor current to heat the vaporizer coils and to thereby obtain synchronism between starting of the gas turbine engine and the heating of the vaporizer, any suitable source of electrical energy may be employed.

An object of the invention is the provision of a self-igniting combustion vaporizer for a combustion chamber of the continuous type.

Another object of the invention is the provision of a self-igniting combustion vaporizer for a combustion chamber of the continuous type that will initiate and maintain combustion substantially independently of ambient conditions and the type of fuel employed.

A further object of the invention is the provision of a self-igniting combustion vaporizer that is electrically energized in synchronism with an electrical starter motor employed to start a continuous type combustion engine.

Other objects and attendant advantages of the present invention will become more readily apparent as the specification is considered in connection with the accompanying drawings in which.

Referring now to the drawings in which like reference numerals designate like parts throughout the several views thereof, there is shown in FIG. 1 a block diagram of a continuous combustion engine, such as a gas turbine engine.

Figure 1:
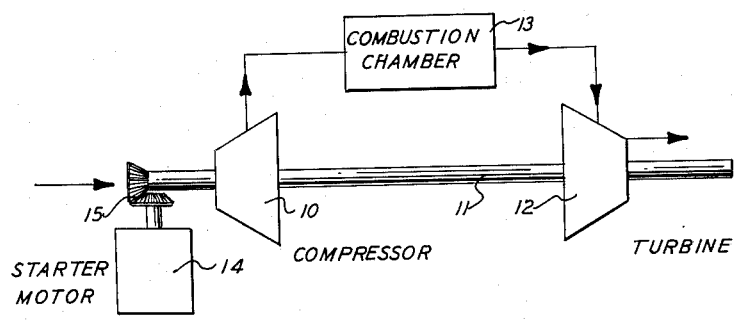
FIG. 1 is a block diagram of a gas turbine engine with which the present invention may be employed.

This gas turbine engine, as shown, includes a compressor 10 mounted on a shaft 11, together with a power turbine 12. A combustion chamber 13 is connected to receive compressed fluid from the compressor 10 and to deliver motive fluid to drive the turbine 12. A continuous process of combustion is carried on within the combustion chamber, as will be explained subsequently, to add heat to the fluid delivered by the compressor. A starter motor designated by the numeral 14 may be coupled to the shaft 11 during engine starting conditions by means of a set of bevel gears 15.

Figure 2:
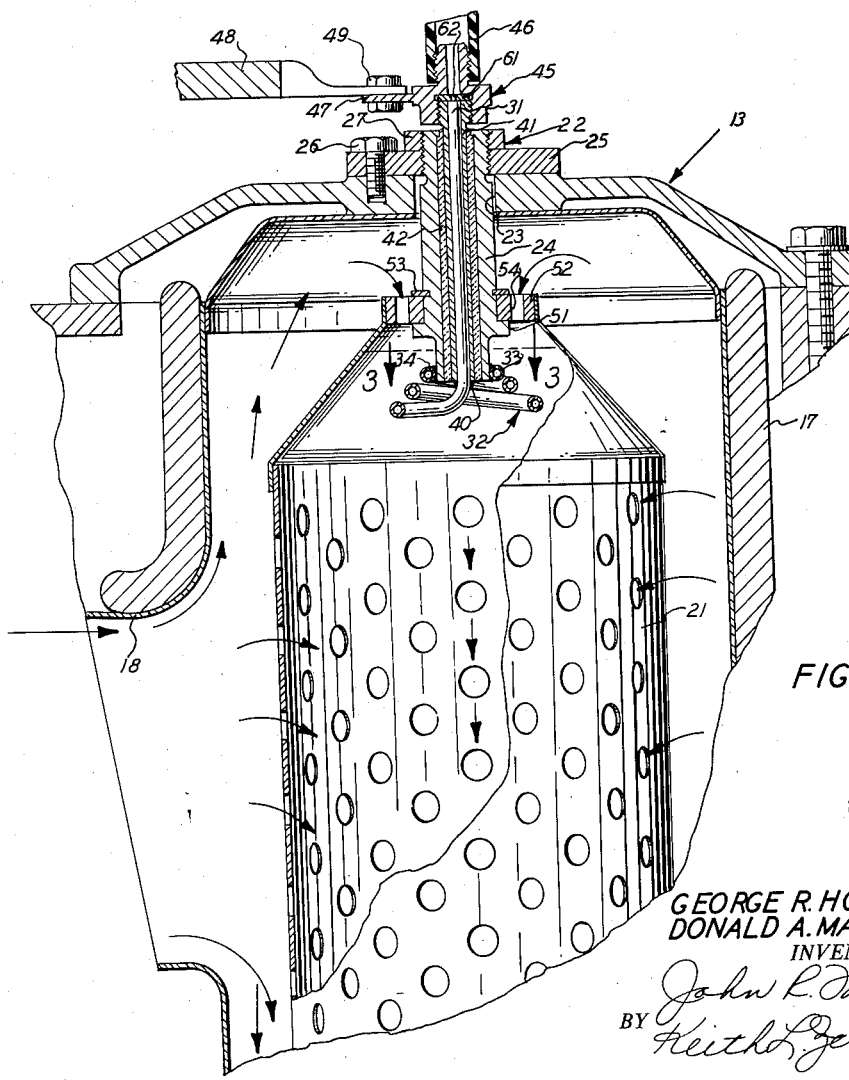
FIG. 2 is a sectional view through a combustion chamber and combustion vaporizer of the present invention.

The combustion chamber of the present invention is shown in FIG. 2 and includes an outer casing member, generally designated by the numeral 17. The combustion chamber may be of the side entry type, as shown, so that air from the compressor is received through an inlet 18. A flame tube 21 having a plurality of holes positioned therein is supported within the housing by conventional means (not shown) positioned at the end of the flame tube.

A combustion vaporizer, generally designated by the numeral 22, extends through a bore 23 in the end of the housing 17. This combustion vaporizer includes an outer casing 24 that is threadedly received within a collar 25. The collar 25 in turn is affixed to the end of the housing 17 by a plurality of bolts, one of which is shown at 26. A lock nut 27 is employed to prevent relative rotation between the outer casing 24 and the collar 25.

Figure 3:
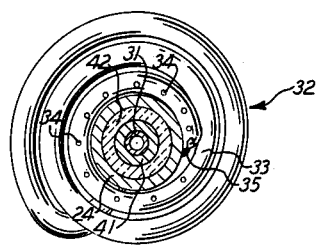
FIG. 3 is a view taken along the lines 3—3 of FIG. 2.

A fuel conduit, preferably in the form of a tube 31, extends through the bore 23 in the housing 17 and is positioned within the casing 24. The fuel conduit 31 terminates within the housing of the combustion chamber in a plurality of coils, generally designated by the numeral 32. One of the coils, preferably coil 33, positioned adjacent the casing 24, contains a plurality of orifices 34 positioned to spray fuel in a direction toward the end of housing 17 and radially outwardly therefrom. The end of the coil 33 is closed off as shown at 35 in FIG. 3. The fuel conduit 31 including coils 32 is constructed of an electrically conductive material having substantial resistivity, for example, a steel-nickel alloy such as Inconel may be employed. The end of the coil 33 may be electrically connected to the casing 24 by welding.

A sleeve 41, constructed of an electrical conductor having a resistivity substantially lower than the resistivity of the tube 31 and coils 32, is positioned over the tube 31 and in electrical contact therewith. This sleeve is preferably constructed of a good conductor, such as copper, and may be welded to the fuel conduit tube 31 at 40 to insure good electrical contact between the coils 32 and the sleeve. An insulating sleeve 42, preferably constructed of a ceramic material to withstand the high temperatures within the combustion chamber, is positioned between the sleeve 41 and the casing 24 to electrically insulate these two members.

A conductive fitting, generally designated by the numeral 45, is threadably received upon the end of the sleeve 41. A conduit 46, preferably constructed of a nonconductor that leads to a source of fuel under pressure (not shown), is connected to the fitting 45. The fitting 45 also includes a lug 47 that is connected to an electrical cable 48 by means of any suitable fastener, for example, nut and bolt assembly 49.

The outer casing 24 of the combustion vaporizer 22 includes a shoulder 51 for receiving an annular plate 52 connected to the flame tube 21, and a snap ring 53 is employed to hold the plate 52 in engagement with this shoulder. The plate has a plurality of apertures 54 positioned therein so that air may be directed therethrough into the vicinity of the coils 32 and the fuel issuing from the orifices positioned within the coil 33. An orifice plate 61, containing a metering orifice 62, is positioned between the end of the conductive sleeve 41 and the fitting 45.

During starting operations of the gas turbine engine, electrical energy is fed to the coils 32 through the cable 48, the lug 47, the fitting 45 and the conductive sleeve 41. Any portion of the coils 32 may be shorted out by conducting bars placed between the coils to obtain the proper amount of resistance in the circuit. As previously stated, the fuel conduit tube 31 is welded or otherwise suitably affixed to the conductive sleeve 41 at 40 where the coils 32 commence. In this arrangement then, the electrical energy flows through the conductive sleeve 41 until it reaches this point and then it flows through the coils and back to the casing 24 which is grounded to the housing 17 of the combustion chamber. The use of the conductive sleeve 41 prevents the straight portion of the fuel tube 31 from being heated since the current will flow through the conductive sleeve 41 rather than through the fuel tube.

A short time after the coils 32 are energized, fuel is fed from the source of fuel under pressure (not shown) through conduit 46 and the fuel tube 31 to the coils. The metering orifice 62 meters this fuel and performs the additional function of breaking the fuel into a plurality of fine droplets. When the fuel reaches the heated coils 32 it is vaporized, and the vaporized fuel then flows through the orifices 34 in the coil 33 into the combustion chamber. When the vaporized fuel strikes the exterior of the heated coils 32 it ignites and combustion is initiated within the flame tube 21.

Figure 4:
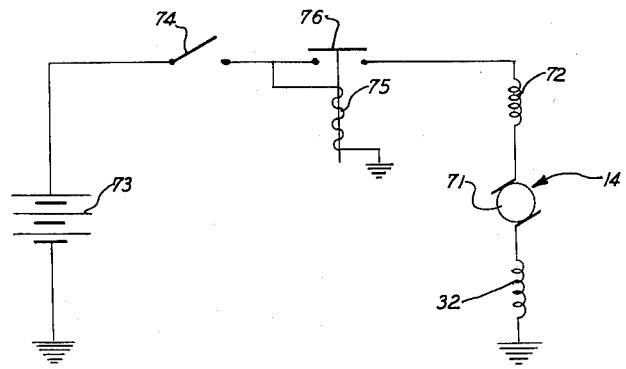
FIG. 4 is a circuit diagram of the starter motor and the combustion vaporizer of the present invention.

In the preferred embodiment of the invention, the coils 32 of the fuel vaporizer are connected in series with starting motor 14. This type of arrangement is shown schematically in FIG. 4. The starting motor 14 is preferably of the series wound type and has an armature 71 connected in series with the field winding 72. A source of electrical energy 73, preferably in the form of a storage battery, is adapted to be connected to the starting motor and the coil 32 through a starter switch 74 that energizes solenoid 75. This in turn moves the armature 76 to complete the circuit from the battery to the starting motor and the coils.

Figure 5:
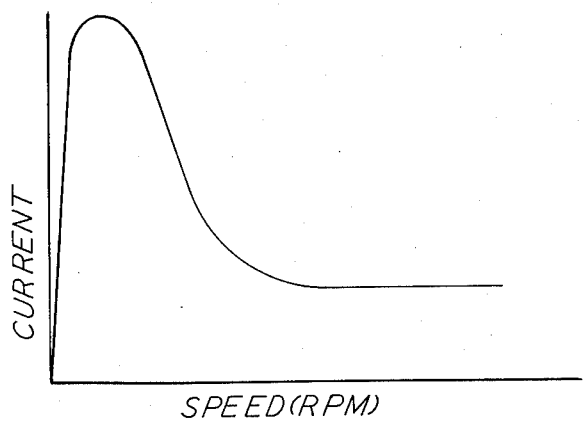
FIG. 5 is a plot of current drawn against speed of the armature in revolutions per minute of a typical series wound starter motor that may be employed with this invention.

When the starter motor is energized, electrical current flows through the coils 32 or the portion thereof that is not shorted out by conductive bars. This type of arrangement has a very distinct advantage in that the current drawn by a series wound starting motor is very high at low speeds. FIG. 5 shows a plot of the current drawn against the speed, in revolutions per minute, of the starter motor. As shown, when the starter motor is first energized and the speed is low because of the inertia of the parts that it must drive, for example, the compressor 10, the current drawn is very high and may be on the order of 600 amps. when a 12 volt battery is employed. This heavy current very quickly heats the coils 32 or the portions thereof that are in series with the starter motor. Thus, the fuel that flows through these coils is very quickly vaporized and when it issues from the orifices 34 it ignites upon coming into contact with the coils 32. With this arrangement the portion of the coils 32 in series with the starter motor come to a red heat very quickly thereby insuring rapid starting of the combustion process.

When the gas turbine engine has started, the starter switch 74 is opened and the starter motor and the coils 32 are deenergized. The combustion process will continue, however, since the heat from the burning fuel within the flame tube will have heated the coils 32 sufficiently to provide for the vaporization and the combustion of the fuel.

The air from the inlet 18 moves through the apertures 54 in the plate 52 and also through the apertures in the flame tube 21 to provide the proper motive fluid for the turbine 12, as is well known in the art.

Thus, the present invention provides an economical and reliable self-igniting combustion vaporizer that may be electrically heated in synchronism with the operation of a starter motor to provide self-ignition. This type of vaporizer renders the combustion process substantially independent of ambient conditions and the type of fuel employed.

It will be understood that the invention is not to be limited to the exact construction shown and described, and that various changes and modifications may be made without departing from the spirit and scope of the invention, as defined in the appended claims.

We claim:

1. In a gas turbine engine combustion chamber, a housing, a fuel vaporizer extending through said housing into said combustion chamber, said fuel vaporizer comprising an outer casing member affixed to said housing, a fuel conduit having a section extending through said outer casing member, said fuel conduit terminating within said combustion chamber in a plurality of coils, one of said coils having a plurality of orifices positioned therein, said fuel conduit being constructed of a material having substantial electrical resistivity, a sleeve of conductive material having substantially lower electrical resistivity than said fuel conduit positioned about said section of the fuel conduit extending through said outer casing and connected to said coils, an electrical insulator positioned between said outer casing member and said sleeve, and an electrical terminal connected to said sleeve for delivering electrical energy to the plurality of coils of said fuel conduit, a portion of said coils remote from said sleeve being connected to said outer casing member.

2. In a gas turbine engine, a combustion chamber including a housing, a fuel vaporizer extending through said housing into said combustion chamber, said fuel vaporizer comprising an outer casing member affixed to said housing, a fuel conduit having a section extending through said outer casing member, said fuel conduit terminating within said combustion chamber in a plurality of coils, one of said coils having a plurality of orifices positioned therein, said fuel conduit being constructed of a material having substantial electrical resistivity, a sleeve of conductive material having substantially lower electrical resistivity than said fuel conduit positioned about said section of fuel conduit extending through said outer casing, said sleeve being electrically connected to said coils, an electrical insulator positioned between said outer casing member and said sleeve, a source of electrical energy, and means for connecting said sleeve and the plurality of coils to said source of electrical energy during engine starting operations, the end of said coils remote from said sleeve being electrically connected to said outer casing member.

3. In a gas turbine engine, a combustion chamber, said combustion chamber including means forming an air passage through said combustion chamber, a fuel vaporizer positioned within said combustion chamber adjacent said air passage, said fuel vaporizer including a section having a plurality of orifices positioned therein, a source of fuel connected to said fuel vaporizer, said plurality of orifices being directed to issue fuel into said air passage upstream of at least a portion of said section whereby fuel is issued from said orifices into said air passage to form a fuel-air mixture adjacent at least a portion of said section, an electrical starter motor connected for starting the gas turbine engine, a source of electrical energy, and means for simultaneously connecting said electrical starter motor and said section of the fuel vaporizer to said source of electrical energy during engine starting conditions, the resistivity of said section and the flow of current through said section being sufficient to cause ignition of said fuel-air mixture.

4. In a gas turbine engine, a combustion chamber, said combustion chamber including means forming an air passage through said combustion chamber, means connected to said combustion chamber to provide a flow of air through said air passage, a fuel vaporizer positioned within said combustion chamber adjacent said air passage, said fuel vaporizer including a section having a plurality of orifices positioned therein, a source of fuel connected to said fuel vaporizer, said plurality of orifices being directed to issue fuel into said air passage upstream of at least a portion of said section whereby fuel is issued from said orifices into said air passage to form a fuel-air mixture adjacent at least a portion of said section, a starter motor for starting the gas turbine engine, said section of the fuel vaporizer being connected in series with said starter motor, a source of electrical energy, and means for connecting said source of electrical energy to said starter motor and said section of the fuel vaporizer during starting operations for igniting the fuel-air mixture.

5. In a gas turbine engine, a combustion chamber, said combustion chamber including means forming an air passage through said combustion chamber, means connected to said combustion chamber to provide a flow of air through said air passage, a fuel vaporizer positioned within said combustion chamber adjacent said air passage, said fuel vaporizer including a coiled fuel conduit constructed of an electrical conductive material having substantial resistivity, said coiled fuel conduit having a plurality of orifices positioned therein, said plurality of orifices being directed upstream of said coiled fuel conduit with respect to air flow through said combustion chamber, a source of fuel connected to said fuel vaporizer whereby fuel is issued from said orifices into said air passage to form a fuel-air mixture capable of contacting said coiled fuel conduit, a starter motor for starting the gas turbine engine, said coiled fuel conduit being connected in series with said starter motor, a source of electrical energy, and means for connecting said source of electrical energy to said starter motor and said coiled fuel conduit during engine starting operations for igniting the fuel-air mixture.

6. A gas turbine engine comprising, a compressor, a combustion chamber connected to receive fluid containing air from said compressor and to deliver motive fluid to power the gas turbine engine, an electrical starter motor operatively coupled to said compressor during engine starting operations, a fuel vaporizer positioned within said combustion chamber, said fuel vaporizer including a fuel conduit constructed of electrical conductive material and having a plurality of orifices positioned therein, said plurality of orifices being directed upstream from at least a portion of said fuel conduit with respect to air flow through said combustion chamber, said fuel conduit being positioned adjacent said flow path of said fluid containing air, a source of fuel connected to said fuel vaporizer whereby fuel is issued from said orifices into the flow path of the fluid containing air to form a fuel-air mixture upstream from at least a portion of said fuel conduit, said electrical starter motor and said fuel conduit being connected in series, and means for energizing said electrical starter motor and said fuel conduit during engine starting conditions to ignite the fuel-air mixture.

7. A gas turbine engine comprising, a compressor, a turbine, a combustion chamber connected to said compressor and to said turbine, said combustion chamber including means forming an air passage to accommodate a flow of air from said compressor to said turbine, an electrical starter motor adapted to be operatively coupled to said compressor during engine starting operations, a fuel vaporizer positioned within said combustion chamber, said fuel vaporizer including a coiled fuel conduit constructed of a conductive material and having a plurality of orifices positioned therein, said plurality of orifices being directed upstream of said coiled fuel conduit with respect to air flow through said combustion chamber, said coiled fuel conduit being positioned adjacent said air passage, means connected to said fuel vaporizer for supplying fuel to said fuel vaporizer and for causing fuel to issue from said orifices into the flow of air from said compressor to said turbine upstream from said coiled fuel conduit whereby a fuel-air mixture is formed that is capable of contacting said coiled fuel conduit, said electrical starter motor and said coiled fuel conduit being connected in series, and means for energizing said electrical starter motor and said coiled fuel conduit during engine starting conditions whereby said fuel conduit is heated to a temperature sufficiently high to ignite said fuel-air mixture.

8. A gas turbine engine comprising a compressor, a turbine, a combustion chamber connected to said compressor and to said turbine, said combustion chamber including means forming an air passage to accommodate a flow of air from said compressor to said turbine, an electrical series wound starter motor operatively coupled to said compressor during engine starting conditions, a fuel vaporizer positioned within said combustion chamber, said fuel vaporizer including a coiled fuel conduit having a plurality of orifices positioned therein and constructed of a conductive material having substantial resistivity, said plurality of orifices being directed upstream of said coiled fuel conduit with respect to air flow through said combustion chamber, said coiled fuel conduit being positioned adjacent said air passage, means driven by said gas turbine engine for delivering fuel to said coiled fuel conduit whereby fuel is issued from said plurality of orifices into the flow of air from said compressor to said turbine to form a fuel-air mixture, said electrical series wound starter motor and said coiled fuel conduit being connected in series, a source of electrical energy, and means for connecting said source of electrical energy to said electrical series wound starter motor and said coiled fuel conduit during engine starting conditions whereby said coiled fuel conduit is heated to a temperature sufficiently high to ignite said fuel-air mixture.

9. In a gas turbine engine, a combustion chamber, said combustion chamber having a casing defining an air passage including an air inlet and an air outlet, a fuel vaporizer positioned within the combustion chamber, said fuel vaporizer comprising a fuel conduit constructed of electrical conductive material having substantial resistivity, said fuel conduit terminating in a section having a plurality of orifices positioned therein, said section being positioned in the path of air flow from said inlet to said outlet, said plurality of orifices positioned in said fuel conduit being directed upstream of said section, a source of fuel, said source of fuel being connected to said fuel conduit whereby fuel issues from said plurality of orifices into the air flowing from said inlet to said outlet upstream of said section having said plurality of orifices positioned therein to form a fuel-air mixture, a source of electrical energy, and means for connecting said source of electrical energy to said section of the fuel conduit having the plurality of orifices during engine starting operations to heat said section of fuel conduit, whereby said fuel-air mixture is ignited.

10. In a gas turbine engine, a combustion chamber, a fuel vaporizer positioned within said combustion chamber, said fuel vaporizer having a terminating section constructed of a coiled tube having a plurality of orifices positioned therein, said combustion chamber including means forming an air passage, said plurality of orifices positioned in said coiled tube being directed upstream from at least a portion of said coiled tube with respect to air flow through said combustion chamber, said fuel vaporizer being adapted to receive fuel under pressure whereby fuel may be supplied to said coiled tube and may be issued from said orifices into said air stream to form a fuel-air mixture capable of contacting at least a portion of said coiled tube, a source of electrical energy, and means for connecting said source of electrical energy to said coiled tube during engine starting conditions whereby said coiled tube will be heated during engine starting conditions to ignite said fuel-air mixture.

References Cited in the file of this patent
UNITED STATES PATENTS

| | | |
|---|---|---|
| 1,047,114 | O'Neill | Dec. 10, 1912 |
| 1,302,505 | Broad | May 6, 1919 |
| 1,452,105 | Aske | Apr. 17, 1923 |
| 1,757,855 | Chilowsky | May 6, 1930 |
| 1,824,985 | Edelman | Sept. 29, 1931 |
| 2,781,637 | Dougherty | Feb. 19, 1957 |
| 2,795,105 | Porter | June 11, 1957 |
| 3,024,607 | Washburn | Mar. 13, 1962 |